July 19, 1932.  T. S. COLE  1,868,046
SYSTEM OF ELECTRICAL DISTRIBUTION
Filed Oct. 16, 1926
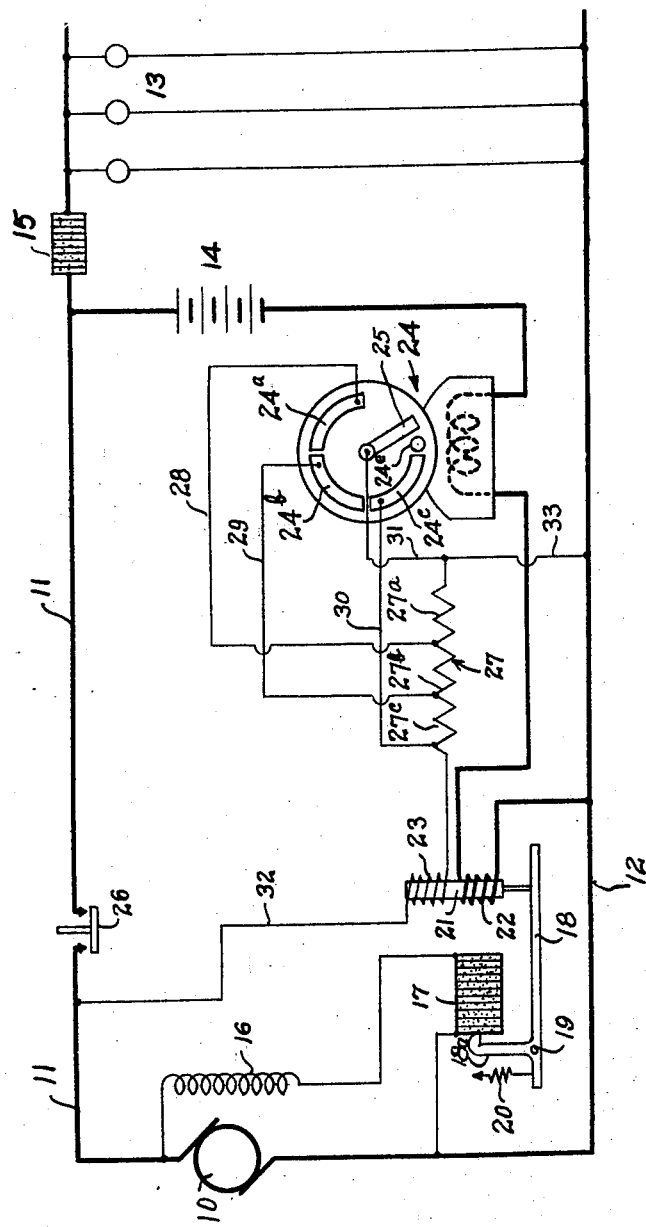
Theodore S. Cole  INVENTOR.
BY Robert S. Blair
ATTORNEY.

Patented July 19, 1932

1,868,046

UNITED STATES PATENT OFFICE

THEODORE S. COLE, OF NEW HAVEN, CONNECTICUT, ASSIGNOR TO THE SAFETY CAR HEATING & LIGHTING COMPANY, A CORPORATION OF NEW JERSEY

SYSTEM OF ELECTRICAL DISTRIBUTION

Application filed October 16, 1926. Serial No. 141,971.

This invention relates to systems of electrical distribution and more particularly to a car lighting system in which the generator is driven, for example, from an axle of the car.

One of the objects of this invention is to provide a system of the above-mentioned character which will be of simple arrangement, of reliable action, and capable of embodiment in practical form in apparatus of simple and rugged construction and of highly efficient action. Another object is to provide a system of the above-mentioned nature in which the storage battery, which may supply energy to the lamp circuit during periods of inactivity of the generator, may be dependably protected against injurious overcharge and by means of apparatus of simple construction and sensitive and efficient action. Another object is to provide a system and apparatus in which the storage battery may be dependably protected against such consequences as generally arise as a result of loss of effectiveness in one or more cells of the battery. Another object is to provide a system and apparatus of the above-mentioned character which will be well adapted to meet the varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing there is shown in the single figure a schematic or diagrammatic representation of the electrical features of my invention.

As conducive to a clearer understanding of certain features of my invention, it might be here noted that, in many existing types of car lighting systems, the protection of the storage battery against over-charge is made dependent upon the characteristic and somewhat abrupt rise in back voltage of the battery as the latter approaches substantially full charge; such a rise in back voltage of the storage battery is, in some of such systems, utilized to bring into action a regulation of the generator for substantially constant voltage at a value such that the battery is thereafter substantially "floated" across the generator. The charging current to the generator is thus brought down to a value incapable of injuring the battery, due to the substantial equalization of the back voltage of the battery with that maintained by the regulating apparatus across the generator terminals.

Systems of the character just described have been found in practice to give excellent results in protecting the battery against overcharge and thus in ensuring long life to the battery. With long-continued use of a storage battery, however, even when the latter is fully protected against the harmful effects of over-charge, the aging of the battery is often accompanied by such inherent changes that, when the battery is substantially fully charged, the characteristic rise in back voltage thereof, at the completion of charge, takes place at what may be termed a lower standard so that the intended regulation of the generator for substantially constant voltage is either not brought into action at all or is delayed for such a long period of time that injurious over-charging sometimes results. A somewhat like effect is brought about should one or more of the cells of the battery become "dead". One of the dominant aims of this invention is to provide a system of regulation in which such disadvantages as those above noted are avoided.

Referring now to the drawing, there is shown at 10 a generator driven, in a car lighting system, from the car axle and being subjected, therefore, to a speed varying with that of the car axle itself. The generator 10 is connected by the main conductors 11 and 12 to the lamp circuit, illustratively shown at 13, and bridged across these main line conductors is also a storage battery 14, adapted thus to receive a charging current from the generator 10. Interposed between the battery 14 and the lamp circuit 13 is a regulator generally indicated at 15; this regulator may be of any appropriate type, preferably of the carbon pile resistance type, and it is arranged to maintain substantial constancy of voltage across the lamps 13.

The generator 10 which is preferably of the shunt wound type is provided with a field winding 16 connected across the terminals of the generator 10 but through a variable resistance preferably taking the form of the carbon pile 17. The pressure on the carbon pile 17 may be varied by any suitable form of mechanical devices and as illustrative of the latter I have shown a bell crank lever 18 pivoted at 19 and having its one arm 18a in engagement with the free or unanchored end of the carbon pile 17. A spring 20 is connected to the lever 18 and acts to swing the latter in such a direction as to tend to compress the carbon pile 17. At one end of the lever 18 is connected the core 21 of a suitable solenoid, the latter including a current-carrying winding 22 and an auxiliary winding 23, the solenoid acting thus in opposition to the spring 20 and in coaction therewith controlling the pressure on the carbon pile 17 and hence controlling also the electrical action of the generator 10.

The current winding 22 is connected to be responsive to the current flowing to the battery 14 and also connected to be responsive to battery current is an ampere hour-meter generally indicated at 24.

The ampere hour-meter 24 may be of any suitable type and preferably embodies such structural features as insure compensation for internal energy losses in the battery 14. The ampere hour-meter 24, provided with the indicator arm 25, will thus dependably indicate the state of charge of the battery 14.

The auxiliary winding 23, which is preferably a winding of fine wire, is bridged across the generator 10 and on the generator side of the main switch generally indicated at 26. The latter may be of any suitable type and is adapted to connect the generator to its circuit upon the attainment by the generator of an appropriate voltage and to disconnect the generator when the voltage of the latter falls to a predetermined value. The circuit of the winding 23, however, includes a variable resistance generally indicated at 27, the latter being arranged to be varied or controlled by the ampere hour-meter 24. The resistance 27 may be of any suitable construction and in the drawing is illustrated as including a relatively fixed resistance appropriately sectionalized, whereby as many sections thereof as may be desired may be made effective. Illustratively, the resistance 27 is shown as having three sections 27a, 27b and 27c.

The ampere hour-meter 27 is provided with a number of contact segments commensurate with the number of sections into which the resistance 27 is divided, these segments being contacted successively by the indicator arm 25 of the meter 24. Thus, segment 24a is connected by conductor 28 to the left-hand end of section 27a of the resistance 27; segment 24b is connected to the left-hand end of the section 27b by conductor 29; and segment 24c is connected to the left-hand end of section 27c of the resistance, by conductor 30. A conductor 31 connects the right-hand end of the resistance 27 to the movable contacting member 25 controlled by the ampere hour-meter 24, while the circuit of the winding 23 will be seen to extend from the generator side of the main conductor 11, thence by way of conductor 32, through the winding 23, thence through the variable resistance 27 and by way of conductor 33 to the other main line conductor 12.

The zero indication, corresponding to a condition wherein the battery 14 is substantially discharged, is indicated on the ampere hour-meter 24 at 24e and the direction of rotation of the indicator and contact arm 25 of the meter during charge of the battery is counter-clockwise. While the contact arm 25 rotates in counter clockwise direction on charge of the battery, it makes successive contact with its associated contact segments and thus successively cuts out successive sections of the resistance 27, until, when approaching a condition of substantially full charge of the battery, it contacts with segment 24c and cuts out all of the sections of the resistance 27. Upon discharge, the direction of rotation of the contact arm 25 is reversed and the sections of the resistance 27 are successively cut into the circuit of the winding 23. The degree of energization of the winding 23 is thus progressively varied in accordance with the varying state of charge of the battery and the degree of energization of the current coil 22, necessary for the latter to effect a movement of the lever 18 in order to control the carbon pile 17, is commensurately varied, the windings 23 and 22 being related to one another so that, on charge of the battery, the two coils act in the same direction upon the core 21.

Assuming the battery 14 to be in a condition of substantial discharge, the contact arm 25 of the meter will assume a position approximating that shown in the drawing; in this position of the arm 25, the full ohmic value of resistance 27 will be in circuit with the winding 23, the latter being correspondingly weakly energized. The parts, such as the number of turns in the current winding 22 and the spring 20 are so adjusted or proportioned with respect to one another that, under the above assumed condition, the generator 10 will be regulated in such a manner that the current flowing to the battery will be relatively large but still of a value which the battery can stand without harm. This relatively high charging rate is maintained through such a period of time as it takes the contact arm 25 of the meter to reach and make contact with the contact segment 24a, whence section 27a of the resistance 27 is short-circuited or cut out of circuit with the auxiliary winding 23. The energization of the winding 23 is thus increased.

Inasmuch as it requires a certain magneto motive force to maintain the movable parts of the generator regulator in equilibrium and since the energization of the winding 23 has been thus increased, the amount of current through the current coil 22 necessary to maintain the regulator parts in equilibrium will be of lesser magnitude than during the initial stage of charge, and the generator will thus be regulated so as to cause a lesser charging current to be passed into the battery 14. This decreased charging current will be maintained substantially constant, in spite of speed changes to which the generator 10 may be subjected, throughout such a period of time as it takes the contact arm 25 to reach and contact with the contact segment 24b, whence section 27b of the resistance 27 becomes short-circuited and thus both sections 27a and 27b cut out of the circuit of the winding 23. The energization of the latter is thus again increased and the generator subsequently regulated, under the control of the current coil 22, to maintain a charging current to the battery of a lesser magnitude.

This lesser magnitude of charging current will thenceforth be maintained for such an interval of time as it takes the contact arm 25 to reach and contact with the next succeeding contact segment in its path of travel and thus when the arm 25 reaches segment 24c, section 27c of the resistance 27, together with the remaining sections thereof, will be cut out of the circuit of winding 23, and the energization of the latter again increased. Segment 24c, being the last segment in the path of travel of the arm 25 and being positioned at a point where the meter 24 indicates substantially full charge of the battery, the above-mentioned final increase in the energization of winding 23 is preferably such that the corresponding battery charging current flowing through the coil 22 is of such a low value that, even though continued for extended periods of time, no substantial overcharge of the battery results and injury to the battery thus precluded.

As illustrative of the progressive decrease in the charging current throughout the period of its charging, it may be noted that, with a battery of sixteen cells of appropriate characteristics and such as is in general use in car lighting systems, the initial charging current, that is, at the beginning of charge, may be sixty amperes and this charging current may be progressively cut down as the charge proceeds until the final current flowing to the battery and corresponding to a condition of substantially full charge of the battery, is of a magnitude of about ten or twelve amperes. This progressive diminution of the battery charging current may take place in as many steps or increments as desired, and the three steps of decrease throughout the period of charging of the battery as hereinabove set forth in connection with the drawing will be understood to be merely illustrative.

The regulation of the generator will be seen to be under the control of the current coil 22, the latter responsive to battery charging current, and in this respect, the distinct advantage is achieved in that greater sensitiveness of control or regulation of the generator is made possible throughout the changes in speed to which the generator 10 is subjected; this is due to the fact that the battery charging current is dependent upon the difference between the generator voltage and the battery voltage and relative changes in this difference between these two voltages are effective to bring about relatively large changes in battery charging current. Close regulation of the generator is thus achieved.

Should one or more of the cells of the battery 14 become "dead" or should the battery by reason of aging, deterioration or other effects, become characterized by the production of a lesser back voltage at substantial completion of its charge, such an occurrence is prevented from being the cause of overcharge of the battery, since the rising back voltage of the battery need not, in accordance with my invention, play any part in bringing into action any battery protective devices or regulation. Thus, while the occurrence of such a defect in the storage battery as above noted might, in systems in which the protection of the battery against overcharge is made dependent upon the back voltage of the battery, cause the continued charging and consequent over-charging of the battery at its normal or high rate of charge, such as, for example, a rate of sixty amperes, in accordance with my invention the substantial completion of charge of the battery, irrespective of how the back voltage of the latter may be affected, is accompanied by the achievement of such a low current flow to the battery that the latter is adequately safeguarded against injury.

Should the battery 14, in the above described operation of the system be assumed to have been finally fully charged, have a portion of its charge withdrawn or should the above described operation of charging be interrupted at an intermediate stage of charging of the battery, due to the generator 10 becoming inactive, the contact arm 25 will be given a position intermediate of its range of travel from minimum indication to maximum indication and will correspondingly effect such an adjustment, by way of its control of the resistance 27, of the energization of the winding 23, that, upon the subsequent charging activity of the generator 10, the latter will be regulated to maintain a charging current to the battery commensurate with or appropriate to the corresponding state of charge of the battery, as indicated by the meter 24. The progressive discharging of the battery will cause a rotation of the contact arm 25 in clockwise direction and will progressively cut into the circuit of winding 23 the various sections of the resistance 27, thus to condition the generator regulator for the maintenance of a battery charging current appropriate to the state of charge of the battery at the time that the generator becomes again effective.

It may furthermore be noted that the voltage of the generator is maintained substantially constant within relatively narrow limits, throughout the different charging stages of the battery and that, therefore, when the lamp or work circuit 13 is closed, the voltage regulator 15 for the latter need not compensate for such a wide range of voltage as would otherwise have to be the case. This for the reason that, instead of maintaining a substantially constant and high rate of charge of the battery throughout its entire period of charge and necessarily accompanied by a substantial increase in voltage of the generator in order to maintain this rate of charge, the rate of charge of the battery is progressively decreased throughout the charging period so that, as the battery nears the completion of its charge, the decreasing charging current can be maintained by substantially the initial voltage at which the initial charging of the battery commenced.

The winding 23, as above noted, is connected across the generator but on the generator side of the main switch 26; it will thus receive energizing current as long as the generator is in operation even though it be operating below critical speed and with the main switch 26 open. Assuming that the battery 14 be supplying current to the lamps 13 while the generator 10 is operating below critical speed, the current discharged from the battery and passing through the coil 22 of the regulator will tend to relieve the pressure on the carbon pile 17 and in thus weakening the excitation of the generator tends to delay the closure of the main switch 26. The presence, however, of the auxiliary winding 23 counteracts this undesired action in that the coils 22 and 23, under the above assumed conditions, act in opposition to each other, the battery being on discharge. Thus, the spring 20 is permitted to maintain a substantial degree of compression of the carbon pile 17 and the prompt "picking up" of the generator 10 followed by the prompt closure of the main switch 26 is assured.

On the other hand, should the lamps 13 be disconnected from the battery 14, while the main switch 26 is open, so that the above described undesired tendency on the part of the coil 22 cannot take place, the energization of winding 23 by the generator while the latter is operating below critical speed does not affect the picking up of the generator since, as will be clear, the winding 23 per se is not of sufficient strength to actuate the lever 18.

It will thus be seen that there has been provided in this invention a system and apparatus in which the various objects hereinbefore noted, together with many thoroughly practical advantages are successfully achieved. It will be seen that the battery is dependably safeguarded even against internal defects that may arise in its condition, and that the system readily lends itself to embodiment in practical form but in apparatus capable of simple and rugged construction and dependable action.

Among the many practical advantages achieved by this invention, it might be noted that the arm 25 of the ampere hour-meter, during the charging of the battery and hence while the circuit of the coil 23 is energized, operates to make contacts with the several contact segments of the meter, thus closing the electrical circuits and that, when the battery is on discharge and the generator 10 at rest so that the circuit of coil 23 is not energized, the contact arm 25 of the meter does not have to open any electrical circuits. Thus, the destructive effects of sparking with resultant corrosion of the contacting parts is vastly minimized.

Furthermore, also, it will be seen that the many advantages of tapering off the charging current to the storage battery are consistently achieved, inasmuch as the action of the apparatus, in this respect, is consistent and not dependent upon factors, such as the back voltage of the battery, which might be variable or subject to such changes as would otherwise forestall the achievement of tapering off of the battery charge.

Furthermore, it might be noted that the storage battery, by reason of certain features of this invention, is not dependent for a safeguard against over-charging upon keeping the ampere hour-meter in exact step with the condition of the battery; compensation for internal losses in the battery, furthermore, need not be made dependent upon a compensating action of the meter. This for the reason that such compensation can be achieved by continued charging of the battery at the lowest rate, as when the meter 24 indicates full charge and its arm 25 is up against the stop 24e. This low rate of final charge of the battery can be continued for substantial periods of time without causing injury to the battery, while at the same time compensation for internal losses in the battery may be adequately achieved. It will furthermore be seen that the system and apparatus are well adapted to meet the varying conditions of hard practical use.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In a system of the character described, in combination, a generator, a storage battery connected to be charged thereby, an ampere hour-meter for determining the state of charge of said battery, regulating means for said generator, means including a coil responsive to current flowing to said battery for operating said regulating means, a coil for affecting the standard of operation of said regulating means, and a variable resistance under the control of said ampere hour-meter for varying the energization of said last-mentioned coil substantially proportionately to the state of charge of said battery, said second-mentioned coil having no regulating effect when said variable resistance has a value corresponding to substantially full charge indication by said ampere hour meter and said second-mentioned coil holding a constancy of current, when said ampere hour meter indicates substantially full charge, so low in value as to be substantially harmless to the battery.

2. In a system of the character described, in combination, a generator, a storage battery connected to be charged thereby, an ampere hour-meter having associated therewith a plurality of contacts for coaction with a member movable by said meter, regulating means for said generator, a coil responsive to current flowing to said battery for operating said regulating means, and a coil bridged across said generator and the degree of energization of which is controlled by said contacts associated with said meter, said second-mentioned coil being related to said first-mentioned coil for progressively lowering the standard of operation of said regulating means under control of said contacts throughout the charging period of said battery but without usurping the function of said current coil in operating said regulating means.

3. In a system of the character described, in combination, a generator, a storage battery connected to be charged thereby, an ampere hour-meter having associated therewith a plurality of contacts for coaction with a member movable by said meter, regulating means for said generator, a coil responsive to current flowing to said battery for operating said regulating means, a coil for setting the standard of operation of said regulating means, and a sectionalized resistance in circuit with said last-mentioned coil, the effectiveness of said sections being controlled by the contacts associated with said ampere hour-meter, said second-mentioned coil being of itself incapable of operating said regulating means, the latter thereby being always under current control.

4. In a system of the character described, in combination, a generator, a storage battery connected to be charged thereby, a measuring instrument for determining the state of charge of the battery, regulating means for said generator adapted to maintain substantial constancy only of current flowing to said battery, and means controlled by said measuring instrument for causing said regulating means to maintain a variable standard of battery charging current varying substantially inversely with the state of charge of the battery.

5. In a system of the character described, in combination, a variable speed generator, a storage battery, an automatic switch for controlling the connection of the generator to said battery, a regulator for said generator, a current responsive coil for controlling said regulator, a coil for affecting the standard of operation of said regulator and associated with the latter to prevent said current responsive coil from affecting the regulator when the battery is discharging and said switch is open, and means for controlling the action of said last-mentioned coil to cause it to set successively lower standards of regulation throughout the period of charging of said battery when said switch is closed, said last-mentioned coil being at all times incapable of controlling said regulator.

6. In a system of the character described, in combination, a generator, a storage battery connected to be charged thereby, a variable resistance for controlling the output of said generator, a coil responsive to the current flowing from said generator to said battery for controlling said variable resistance, a coil bridged across said generator and magnetically related to said current coil and to act in the same direction therewith during flow of current from the generator to said battery, an ampere hour meter for indicating the charging current to said battery, means responsive to said ampere hour meter for progressively increasing the energization of said second-mentioned coil as the charge of the battery proceeds, means forming a mechanical resistance acting in opposition to said two coils, said two coils and said last-mentioned means being proportioned and related to each other so that, even at the lowest standard of operation of said current coil, said second-mentioned coil is incapable of overcoming said mechanical resistance.

In testimony whereof, I have signed my name to this specification this 13th day of October 1926.

THEODORE S. COLE.